United States Patent [19]

White

[11] Patent Number: 5,522,113
[45] Date of Patent: Jun. 4, 1996

[54] REFILL WIPER ELEMENT WITH FRANGIBLE CLAMPS

[75] Inventor: John M. White, Vienna, Va.

[73] Assignee: Rally Accessories, Inc., Miami, Fla.

[21] Appl. No.: 379,780

[22] Filed: Jan. 27, 1995

[51] Int. Cl.⁶ .................................................. B60S 1/04
[52] U.S. Cl. ................ 15/250.361; 15/250.452; 15/250.48; 15/250.001; 15/250.31
[58] Field of Search .......................... 15/250.42, 250.31, 15/250.32, 250.001, 250.36, 250.35, 245; 16/108, 109

[56] References Cited

U.S. PATENT DOCUMENTS

| | | | |
|---|---|---|---|
| 2,750,617 | 6/1956 | Oishei | 15/250.36 |
| 3,094,734 | 6/1963 | Hoyler | 15/250.36 |
| 3,153,254 | 10/1964 | Lenz et al. | 15/250.42 |
| 3,233,273 | 2/1966 | Anderson | 15/250.42 |
| 3,626,544 | 12/1971 | Lopez et al. | 15/250.42 |
| 3,703,018 | 11/1972 | Seiler et al. | 15/250.42 |
| 4,271,558 | 6/1981 | D'Alba | 15/250.42 |
| 5,023,972 | 6/1991 | Bauer et al. | 15/250.42 |
| 5,231,730 | 8/1993 | Schmid et al. | 15/250.42 |

*Primary Examiner*—Gary K. Graham
*Attorney, Agent, or Firm*—Longacre & White

[57] ABSTRACT

A wiper refill element for a wiper blade and a method for the assembly of the wiper refill element to the wiper blade. The spring bars are held in lateral grooves of a wiper rubber squeegee body and are secured by frangible holding clamps lapping over the squeegee body of the wiper rubber wherein during the assembly with the supporting yoke system of a wiper blade the clamps are pried off of the refill element.

9 Claims, 1 Drawing Sheet

REFILL WIPER ELEMENT WITH FRANGIBLE CLAMPS

BACKGROUND OF THE INVENTION

1. Field of the Invention

This invention relates to a spare wiper element for a wiper blade for motor vehicles, and to a method of mounting the spare wiper element in a wiper blade.

2. Description of the Prior Art

The wiper rubber element of typical wiper blades consists of a basic squeegee body and of a wiper lip which is held on the basic body by means of a tiltable web. The basic body includes a longitudinal groove on both sides, into which groove a spring bar is laterally inserted. The spring bar is protected against longitudinal displacement by holding elements on the wiper rubber element. In general a rib on the wiper rubber serves as a holding element, which rib engages laterally in a notch in the spring bar. The spring bars are secured against laterally removal from the longitudinal groove by holding claws on clawed yokes of a supporting yoke system carrying the wiper rubber element.

When the wiper blade has a construction of this type, manual assembly is carried out with difficulty. For this reason a spare wiper element consisting of wiper rubber and the two spring bars is rarely offered on the market for an exchange of the wiper elements originally installed as standard fittings. Accordingly, the completely assembled wiper blade normally is exchanged. This is preferred for reasons of safety, but on the other hand the cost involved is considerably greater than if the wiper rubber refill element by itself was replaced.

Examples of prior art methods of retaining the spring bars in the lateral grooves of the wiper refill are shown in U.S. Pat. No. 5,023,972.

In the '972 patent longitudinally slideable clamps are shown which displace along the length of the refill element as the refill is assembled to the wiper blade. The disadvantage of this system is the longitudinal displacement of the clamps. Owing to the need to have the clamps displaceable the clamps move during manipulation and assembly processes involving the refill and the springs bars fall out or dislodge from the refill. The very feature of displaceability which has an advantage in the '972 device results in disadvantageous awkwardness on many occasions.

SUMMARY OF THE INVENTION

The present invention is based on the recognition that a main difficulty for the assembly is holding the curved spring bars in the longitudinal grooves of the basic refill rubber body. However this difficulty is overcome if, according to the invention, the basic body is encompassed by at least one frangible holding clamp which secures the spring bars during the assembly of the wiper in the longitudinal grooves transversely to the longitudinal direction. Thus a pre-assembled structural unit of wiper rubber element and spring bars held in the longitudinal grooves is provided.

In a preferred embodiment the holding clamp is held on the basic body of the wiper element in a longitudinally nondisplaceable manner with a light-press fit. The press fit thereby also ensures that during transportation the pre-mounted spare wiper element is retained as a structural unit. The press fit thereby is selected in such a manner that a longitudinal displacement is prevented that after the assembly the holding clamp can be flipped off from the basic body of the wiper rubber element without undue difficulty by the installers thumb or other convenient digit. The holding clamp preferable includes a reduced thickness portion, or other stress concentrating feature, to aid in breaking the clamp off the refill in a frangible manner.

The invention also relates to a method for the assembly of a wiper blade using a spare wiper element with a clamp or a mounting mandrel. In these mounting methods the spring bars inserted in the grooves of the basic body are at first secured against lateral displacement and, thereafter, the structural unit is fitted in the supporting yoke system. During assembly, the safeguarding elements which are formed as holding clamps are flipped off in the lateral direction of the wiper blade until they fall away from the basic body, during the course of final assembly.

BRIEF DESCRIPTION OF THE DRAWINGS

The present invention and the advantageous embodiments thereof are described in greater detail on the following detailed description of the embodiments shown in the accompanying drawings, in which.

DETAILED DESCRIPTION

Figure 1:
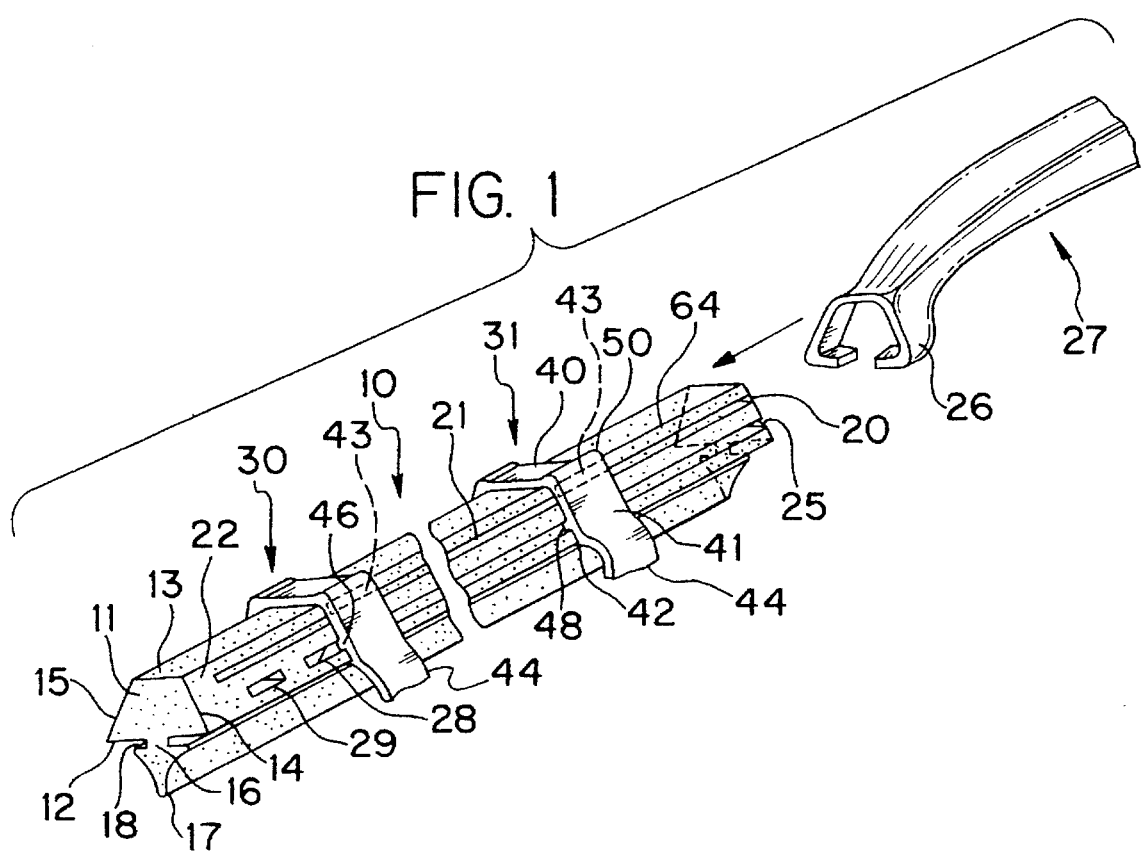
FIG. 1 is a perspective view of a spare wiper element and including on the end thereof a clawed yoke.

In FIG. 1 a wiper rubber element is generally designated 10. This wiper rubber element has a basic squeegee body 11 with a base 12, a back surface 13 and two lateral surfaces 14 and 15. A tiltable web 16 projects from the base 12, by way of which web a wiper lip 17 is tiltably connected with the basic body 11. In the basic body 11 two guide grooves 20 for receiving a metallic spring bar 21 each are laterally incorporated. The longitudinal grooves 20 normally are closed on one side of the wiper blade and thus form a holding element 22 which protects the spring bar 21 against longitudinal displacement. If the longitudinal groove 20 is open at the other side in most cases a spring bar is used with a notch (not shown) which notch engages a rib laterally projecting from the longitudinal groove 20.

A further longitudinal groove 25 for receiving the claws 26 of the clawed yokes 27 is incorporated in the basic body. This longitudinal groove 25 also is closed on one side and by way of a slope 28 ends in a recess 29 in which, when the assembly is terminated, the outermost claw 26 engages in a form-fit manner with minimal play. The spring bars 21 are secured from falling out transversely to the longitudinal direction of the wiper rubber by these holding claws 26 of the supporting yoke system.

The two frangible holding clamps 30 and 31 are essential for the present invention, and are arranged with a short distance from the end of the wiper rubber element 10. The exact construction of these holding clamps are fully illustrated in cross-section in FIG. 2. According to FIG. 2, each holding clamp 30, 31 comprises a web 40 and lateral shanks 41 laterally projecting from web 40 as well as holding webs 42 bent from the ends of the lateral shanks. Web 40, the two lateral shanks 41 and the holding webs 42 border a space which is adapted to the cross section (shown here as a trapezoid, but which can be any suitable shape) of the basic body 11 of the wiper rubber, whereby the holding webs 42 engage behind the base 12 of the basic body 11, or in the groove 18 of the web. Thus these frangible holding clamps 30, 31 encompass the basic body 11 of the wiper rubber 10 essentially completely.

At least one of the lateral shanks 41 of the clamps 30, 31 should preferably include a reduced thickness hinge section 43. This reduced thickness section eases the hinging action between the respective lateral shanks 41 as the clamps 30, 31 are pried from around the refill 11 by manipulation of lateral extension 44. The lateral extension 44 is intended to aid a user in gaining purchase on the clamp and prying the clamp off the refill. The reduced thickness hinge also aids the frangible break off operation of the clamps 30, 31.

Figure 2:
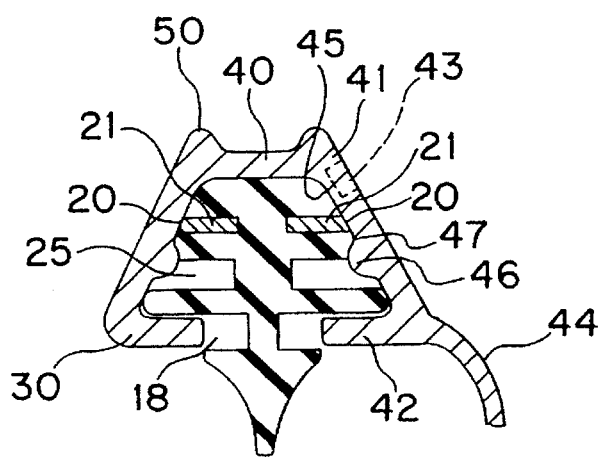
FIG. 2 is an enlarged representation of a section through a spare wiper element with a frangible holding clamp according to the present invention.

The frangible holding clamps 30, 31 are to held on the basic body 11 of the wiper rubber 10 with light press fit preferably in a longitudinally nondisplaceable manner. This press fit can be created by two measures. On the one hand the transition 45 between the web 40 and the lateral shanks 41 is rounded off in such a manner that there takes place a material deformation of the basic body 11 having an angled cross section. This is illustrated in FIG. 2. Furthermore, a bead 46 projects from the lateral shanks 41 of the holding clamp 30, 31, which bead engages in the guide groove 25 for receiving the claws 26 thereby deforming the border area 47. Thus part of the basic body 11 is locally deformed transversely to the longitudinal direction by the rounded-off transition 45 or the bead 46, so that the press fit for the holding clamp 30, 31 is realized. Thus, in the assembly the function of the holding clamp is to an increasing extent performed by the claws 26 of the clawed yokes 27 until the frangible holding clamps are removed. Thereby, the spring bar 21 is prevented from falling out of the longitudinal grooves 20 of the wiper rubber of the wiper element. This feature is utilized both for transportation and for the assembly in the wiper blade frame. Finally it is pointed out that the frangible holding clamp can be made from suitably light gauge metal sheet or from plastic material, or any other suitable material. The reduced thickness portion 43 can alternatively be formed from another stress concentrating feature, i.e., a scored line or sharp dimensional transition in the lateral shanks 41.

What is claimed is:

1. An elongated spare wiper refill element for a wiper blade assembly, said refill element comprising an elongated wiper rubber having an elongated basic body and a wiper lip, said wiper lip is held on the basic body by a tiltable web, said refill element further comprises two elongated spring bars each of which is laterally inserted in an associated longitudinal groove formed in the basic body and are protected there against longitudinal displacement by integral holding elements on the wiper rubber and after a final assembly of the wiper refill element with the blade assembly are secured by holding claws on a supporting yoke system transversely to the longitudinal direction of the wiper rubber, wherein in the refill element the basic body of the wiper rubber is encompassed by at least one longitudinally extending holding clamp which secures the spring bars in the longitudinal grooves during assembly of the wiper refill with the blade assembly and which said at least one holding clamp is resistant to longitudinal movement along said wiper rubber and wherein said holding clamp is removable from said blade assembly after assembly of the wiper refill with the blade assembly by prying in a lateral direction said at least one holding clamp from around said basic body by digital manipulation of a lateral projection appended to said at least one holding clamp said lateral projection extending laterally away from said wiper rubber of said wiper refill and being arcuate along its lateral extension, said projection sized to accommodate a human digit thereon so as to facilitate said digital manipulation.

2. A spare wiper refill element according to claim 1, wherein the at least one holding clamp is held on the basic body of the wiper rubber with a press fit.

3. A spare wiper refill element according to claim 2, wherein the at least one holding clamp includes a connecting web and lateral shanks, each shank projects laterally from the connecting web, holding webs are bent from the ends of the lateral shanks so that the said web, the lateral shanks and the holding webs substantially border a space adapted to a transverse cross section of the basic body of the wiper rubber element, wherein said holding webs engage behind a base of the basic body.

4. A spare wiper refill element according to claim 1 wherein the clamp is formed from a light gauge metal sheet.

5. A spare wiper refill element according to claim 1, wherein the clamp is made of a plastic material.

6. A spare wiper refill element according to claim 1 wherein the at least one holding clamp comprises two holding clamps, the spring bars are held in the respective longitudinal grooves by said holding clamps, said clamps are provided adjacent opposite ends of the wiper rubber, respectively within.

7. A spare wiper refill element according to claim 1 wherein said at least one holding clamp includes a stress concentrating means along its length to further enable said prying, said means comprising a local weakening of said holding clamp along its length and transverse to said longitudinal direction of said refill element.

8. A spare wiper refill element according to claim 7 wherein said stress concentrating means comprises a reduced thickness portion of said holding clamp along its length.

9. A spare wiper refill element according to claim 7 wherein said stress concentrating means comprises an abrupt change in transverse cross-sectional dimension of said holding clamp along its length.

* * * * *